United States Patent
Kidney

(10) Patent No.: US 8,176,390 B2
(45) Date of Patent: May 8, 2012

(54) SINGLE XOR OPERATION WEAVER RECONSTRUCTION OF A FAILED DRIVE OF A RAID

(75) Inventor: Kevin Lee Kidney, Lafayette, CO (US)

(73) Assignee: LSI Corporation, Milpitas, CA (US)

(*) Notice: Subject to any disclaimer, the term of this patent is extended or adjusted under 35 U.S.C. 154(b) by 631 days.

(21) Appl. No.: 12/424,559

(22) Filed: Apr. 16, 2009

(65) Prior Publication Data

US 2010/0269014 A1    Oct. 21, 2010

(51) Int. Cl.
G06F 11/00    (2006.01)
(52) U.S. Cl. .............................. 714/770; 714/765
(58) Field of Classification Search ........... 714/770, 714/764, 763, 765, 766, 718, 710, 42, 6.1, 714/6.21, 6.32; 711/114, 118, 119
See application file for complete search history.

(56) References Cited

OTHER PUBLICATIONS

James Lee Hafner, WEAVER Codes: Highly Fault Tolerant Erasure Codes for Storage Systems, Dec. 2005, FAST '05: 4th USENIX Conference on File and Storage Technologies, San Francisco, CA, (Last visited Apr. 30, 2009).

*Primary Examiner* — Dieu-Minh Le
(74) *Attorney, Agent, or Firm* — Raj Abhyanker, P.C.

(57) ABSTRACT

Several methods and apparatus to single XOR operation weaver reconstruction of a failed drive of a raid are disclosed. A failed drive of the drive group implemented in a WEAVER code with an (n,t,t) layout is determined. A set of scatter/gather lists is produced from a number of the other drives of the drive group. A scatter/gather list is created by modifying a pointer data of the set of scatter/gather lists. An additional scatter/gather list is generated from the set of scatter/gather lists. A single XOR operation is performed on the data segment, the parity segment, the additional data segment and the additional parity segment to form a resulting scatter/gather list including a resulting data segment and a resulting parity segment. The resulting data segment and the resulting parity segment are written as sequenced in the resulting scatter/gather list to a replacement drive.

20 Claims, 6 Drawing Sheets

SINGLE XOR OPERATION WEAVER RECONSTRUCTION OF A FAILED DRIVE OF A RAID

FIELD OF TECHNOLOGY

This disclosure relates generally to an enterprise method of storage area and management and in one example embodiment to single XOR operation weaver reconstruction of a failed drive of a raid

BACKGROUND

A particular drive of a redundant array of independent disks (RAID) may fail. Consequently, any data and parity data stored on the particular drive is lost. However, equivalent data and parity data may be stored on other drives of the RAID. This equivalent data and parity data can be use to reconstruct the lost data and parity data of the failed drive. A WEAVER code with an (n,t,t) layout may have been implemented on the RAID to arrange the data and parity data of the RAID. The failed drive may be reconstructed using the WEAVER code with an (n,t,t) layout. A particular method of recreation using the WEAVER code with an (n,t,t) layout in the prior art requires multiple XOR operations to generate a single final scatter/gather list that may then be written to a hot spare drive. The multiple XOR operations may use additional system resources.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

Several methods and apparatus to single XOR operation weaver reconstruction of a failed drive of a raid are disclosed.

An exemplary embodiment provides a computer-implemented method of reconstructing a drive of a redundant array of independent disks. A failed drive of the drive group implemented in a WEAVER code with an (n,t,t) layout is determined. A set of scatter/gather lists is produced from a number of the other drives of the drive group. The set of scatter/gather lists includes a set of pointer data to refer to a data segment, a parity segment, an additional data segment and an additional parity segment. A scatter/gather list is created by modifying a pointer data of the set of scatter/gather lists. The scatter/gather list includes a modified set of pointer data to refer to the data segment and the parity segment. An additional scatter/gather list is generated from the set of scatter/gather lists. The additional scatter/gather list includes an additional set of modified pointer data to refer to the additional data segment and the additional parity segment. A single XOR operation is performed on the data segment, the parity segment, the additional data segment and the additional parity segment to form a resulting scatter/gather list including a resulting data segment and a resulting parity segment. The resulting data segment and the resulting parity segment is written as sequenced in the resulting scatter/gather list to a replacement drive such that the replacement drive includes a functional equivalent of the failed drive.

An exemplary embodiment provides a computer-implemented method of redundant array of independent disks with a WEAVER code layout. A scatter/gather list $\alpha$ referring to a parity segment $\alpha$ and a parity segment $\lambda$ is combined with a scatter/gather list $\beta$ referring a data segment $\alpha$ and a data segment $\beta$ to generate a scatter/gather list $\gamma$ referring to the data segment $\alpha$, the parity segment $\alpha$, the data segment $\beta$ and the parity segment $\beta$. The scatter/gather list $\beta$ is combined with a scatter/gather list $\Delta$ referring to a data segment $\Delta$ and a data segment $\Theta$ to generate a scatter/gather list $\mu$ referring to the data segment $\alpha$, the data segment $\beta$, the data segment $\Delta$, and the data segment $\Theta$. An XOR operation is performed with an XOR engine processor on the parity segment a and the data segment a to generate a data segment $\pi'$, on the data segment $\alpha$ and the data segment $\beta$ to generate a parity segment $\rho'$, on a parity segment $\beta$ and the data segment $\Delta$ to generate a data segment $\tau'$, on the data segment $\Delta$ and the data segment $\Theta$ to generate a parity segment $\Delta'$. The data segment $\pi'$, the parity segment $\rho'$, the data segment $\tau'$ and the parity segment $\psi'$ is written to a replacement drive such that the replacement drive includes a functional equivalent of a failed drive including the data segment $\pi$, the parity segment $\rho$, the data segment $\tau$ and the parity segment $\psi$.

An exemplary embodiment provides an apparatus for reconstructing a drive of a redundant array of independent disks. The apparatus includes the redundant array of independent disks, and a WEAVER code module to implement a WEAVER code with a (n,t,t) layout on a drive group of the redundant array of independent disks. The apparatus also includes an initial list module. The initial list module produces a set of scatter/gather lists from a number of the other drives of the drive group. The set of scatter/gather lists includes a set of pointer data to refer to a data segment, a parity segment, an additional data segment and an additional parity segment. Further, the apparatus includes a list modifier module. The list modifier module creates a scatter/gather list by modifying a pointer data of the set of scatter/gather lists. The scatter/gather list includes a modified set of pointer data to refer to the data segment and the parity segment and to generate an additional scatter/gather list from the set of scatter/gather lists. The additional scatter/gather list includes an additional set of modified pointer data to refer to the additional data segment and the additional parity segment. The apparatus also includes an XOR engine. The XOR engine performs a single XOR operation on the data segment, the parity segment, the additional data segment and the additional parity segment to form a resulting scatter/gather list including a resulting data segment and a resulting parity segment. In addition, the apparatus includes a reconstruction module to write the resulting data segment and the resulting parity segment as sequenced in the resulting scatter/gather list to a replacement drive such that the replacement drive includes a functional equivalent of a failed drive.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying Drawings and from the Detailed Description that follows.

BRIEF DESCRIPTION OF THE VIEWS OF DRAWINGS

Example embodiments are illustrated by way of example and not limitation in the figures of the accompanying drawings, in which like references indicate similar elements and in which:

FIG. 1 diagrammatic view illustrating reconstruction of a failed drive by applying single XOR operation and writing a resulting Scatter/gather list to a replacement drive, according to one embodiment.

Other features of the present embodiments will be apparent from the accompanying Drawings and from the Detailed Description that follows.

DETAILED DESCRIPTION

Several methods and apparatus to single XOR operation weaver reconstruction of a failed drive of a raid are disclosed.

Figure 1:
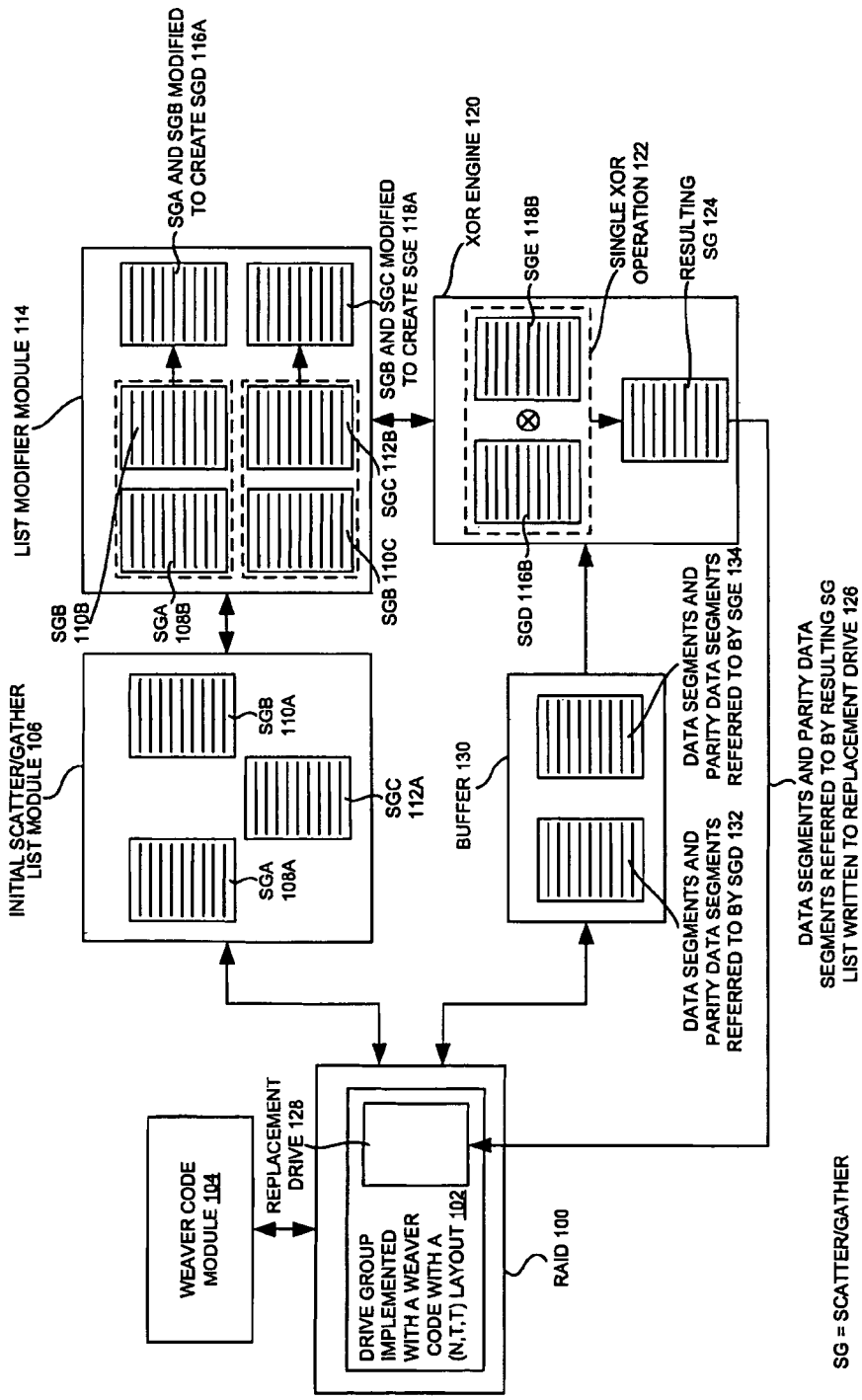

FIG. 1 diagrammatic view illustrating reconstruction of a failed drive by applying single XOR operation and writing a resulting Scatter/gather list to a replacement drive, according to one embodiment, Particularly, FIG. 1 illustrates, a RAID 100, a drive group implemented with a WEAVER code with a (n,t,t) layout 102, a WEAVER code module 104, an initial scatter/gather list module 106, a scatter/gather list A 108A-B, a scatter/gather list B 110A-C, a scatter/gather list C 112A-B, a list modifier module 114, a scatter/gather list A and scatter/gather list B modified to create scatter/gather list D 116A, a scatter/gather list B and scatter/gather list C modified to create scatter/gather list E 118A, a scatter/gather list D 116B, a scatter/gather list E 118 B, an XOR engine 120, a single XOR operation 122, a resulting scatter/gather list 124, a replacement drive 128, a buffer 130, a data segments and parity data segments referred to by scatter/gather list D 132, and a data segments and parity data segments referred to by scatter/gather list E 134, according to one embodiment.

In an example embodiment the WEAVER code module 104 may be communicatively coupled to the RAID 100. The RAID 100 includes the drive group implemented with a WEAVER code with a (n,t,t) layout 102. The drive group implemented with a WEAVER code with a (n,t,t) layout 102 includes the replacement drive 128. The RAID 100 is communicatively coupled to the initial scatter/gather list module 106 and the buffer 130. The buffer 130 is a memory used to temporarily store data and may include a cache. The initial scatter/gather list module 106 includes the scatter/gather list A 108A, the scatter/gather list B 110A and the scatter/gather list C 112A. The initial scatter/gather list module 106 is communicatively coupled to the list modifier module 114. The list modifier module 114 includes the scatter/gather list A 108B, the scatter/gather list B 110B, the scatter/gather list B 110C, the scatter/gather list C 112B, the scatter/gather list A and scatter/gather list B modified to create scatter/gather list D 116A and the scatter/gather list B and scatter/gather list C modified to create scatter/gather list E 118A. The list modifier module 114 is communicatively coupled to the XOR engine 120. The buffer 130 communicates to the XOR engine 120. The buffer 130 includes the data segments and parity data segments referred to by scatter/gather list D 132 and the data segments and parity data segments referred to by scatter/gather list E 134. The XOR engine 120 includes the scatter/gather list D 118B, the scatter/gather list E 118C, the single XOR operation 122 and the resulting scatter/gather list 124. The data segments and parity data segments referred to by resulting scatter/gather list 124 are written to the replacement drive 128.

According to one embodiment, the WEAVER code module 104 implements a WEAVER code with a (n,t,t) layout on a drive group of the redundant array of independent disks. In the layout (n,t,t) n may be a number of drives in the drive group, t includes a fault tolerance of the WEAVER Code layout.

The drive group implemented with a WEAVER code with a (n,t,t) layout 102 may be a drive group of the RAID 100 that may include a WEAVER code implemented through the WEAVER code module 104. The RAID 100 may be a system of multiple hard drives for sharing or replicating data.

An initial list module generates a set of scatter/gather lists from a number of the other drives of the drive group. For example the initial scatter/gather list module 106 may produce a set of scatter gather lists, scatter/gather list A 108A, scatter/gather list B 110A and scatter/gather list C 112A. The set of scatter/gather lists may include a set of pointer data to refer to a data segment, a parity segment, an additional data segment and an additional parity segment.

The list modifier module 114 creates a scatter/gather list by modifying a pointer data of the set of scatter/gather lists. For example, the list modifier module 114 may modify the scatter/gather list A 108A and the scatter/gather list B 110B to create a modified scatter/gather list scatter/gather list D as illustrated in FIG. 1. Further, the list modifier module 114 modifies the scatter/gather list B 110C and scatter/gather list C 112B to create a modified scattered gathered list scatter/gather list E. The scatter/gather list includes a modified set of pointer data to refer to the data segment and the parity segment and to generate an additional scatter/gather list from the set of scatter/gather lists. The additional scatter/gather list includes an additional set of modified pointer data to refer to the additional data segment and the additional parity segment.

The XOR engine 120 performs the single XOR operation 122 on the data segment, the parity segment, the additional data segment and the additional parity segment to form a resulting scatter/gather list. For example, the XOR engine 120 may perform the single XOR operation 122 on the scatter/gather list D 118B to produce the resulting scatter/gather list 124. The resulting scatter/gather list may include a resulting data segment and a resulting parity segment.

The buffer 130 includes a temporary storage area where frequently accessed data is stored for rapid access. The data stored in the buffer 130 is used for accessing the buffered copy rather than re-fetching or re-computing the original data. In a particular example embodiment, the data segments and parity data segments referred to by scatter/gather list D 132 are stored in the buffer. In an example embodiment, the data segments and parity data segments referred to by scatter/gather list E 134.

A failed drive of the drive group implemented in a WEAVER code with an (n,t,t) layout is determined. For example, in a particular embodiment, a RAID engine may determine the failed drive 306. A set of scatter/gather lists is produced from a number of the other drives of the drive group. For example, a set of scatter gather lists scatter/gather list A 108A, scatter/gather list B 110A and scatter/gather list C 112A may be produced using the initial scatter/gather list module 106 from the other drives of the drive group. The set of scatter/gather lists includes a set of pointer data to refer to a data segment, a parity segment, an additional data segment and an additional parity segment. A scatter/gather list is created by modifying a pointer data of the set of scatter/gather lists. The scatter/gather list includes a modified set of pointer data to refer to the data segment and the parity segment. For example, the scatter/gather list A 108B and the scatter/gather list B 110B is modified to create a modified scattered gathered list by modifying a pointer data of the scatter/gather list A 108B and the scatter/gather list B 110B. Further, the scatter/gather list B 110C and the scatter/gather list C 112B is modified to create a modified scattered list by modifying a pointer data of the scatter/gather list B 110C and the scatter/gather list C 112B.

An additional scatter/gather list is generated from the set of scatter/gather lists. The additional scatter/gather list includes an additional set of modified pointer data to refer to the additional data segment and the additional parity segment. The single XOR operation 122 is performed on the data segment, the parity segment, the additional data segment and the additional parity segment to form a resulting scatter/gather list. For example, the single XOR operation 122 may be performed on the scatter/gather list D 118B and the scatter/gather list E 118C by the XOR engine 120. The resulting scatter/gather list 124 may include a resulting data segment and a resulting parity segment.

The resulting data segment and the resulting parity segment are written in a specified sequence to the resulting scatter/gather list to the replacement drive 128. The replacement drive 128 includes a functional equivalent of the failed drive. A reconstruction module writes the resulting data segment and the resulting parity segment as sequenced in the resulting scatter/gather list to the replacement drive 128. The resulting data segment and the resulting parity segment are arranged. The resulting scatter/gather list includes a same sequence as the failed drive. The reconstruction module arranges the resulting data segment and the resulting parity segment.

The resulting data segment results from an XOR operation of the data segment and the additional parity segment. The resulting parity segment result from an XOR operation of the data segment and the additional data segment. The resulting data segment is equivalent to a failed drive data segment and the resulting parity segment may be equivalent to a failed drive parity segment.

According to another example embodiment, a scatter/gather list α referring to a parity segment α and a parity segment λ is combined with a scatter/gather list β referring a data segment α and a data segment β to generate a scatter/gather list γ referring to the data segment α, the parity segment α, the data segment β and the parity segment β. This operation may be performed by the structures of FIG. 1. The scatter/gather list β is combined with a scatter/gather list Δ referring to a data segment Δ and a data segment Θ to generate a scatter/gather list μ referring to the data segment α, the data segment β, the data segment Δ, and the data segment Θ. A single XOR operation is performed with an XOR engine processor 120 on the parity segment α and the data segment α to generate a data segment π', on the data segment α and the data segment β to generate a parity segment ρ', on a parity segment β and the data segment Δ to generate a data segment τ', on the data segment Δ and the data segment Θ to generate a parity segment Δ'. The data segment π', the parity segment ρ', the data segment τ' and the parity segment ψ' is written to the replacement drive 128. For example the replacement drive 128 may include a functional equivalent of a failed drive including the data segment π, the parity segment ρ, the data segment τ and the parity segment ψ. This operation may be performed by the structures of FIG. 1.

The data segment α, the parity segment α, the data segment β, the parity segment β, the data segment α, the data segment β, the data segment Δ, and the data segment Θ is written to the buffer 130. The data segment α, the parity segment α, the data segment β and the parity segment β is sequenced according to a specified order. The data segment α, the data segment β, the data segment Δ, and the data segment Θ is sequenced according to another specified order. This operation may be performed by the structures of FIG. 1.

Figure 2:
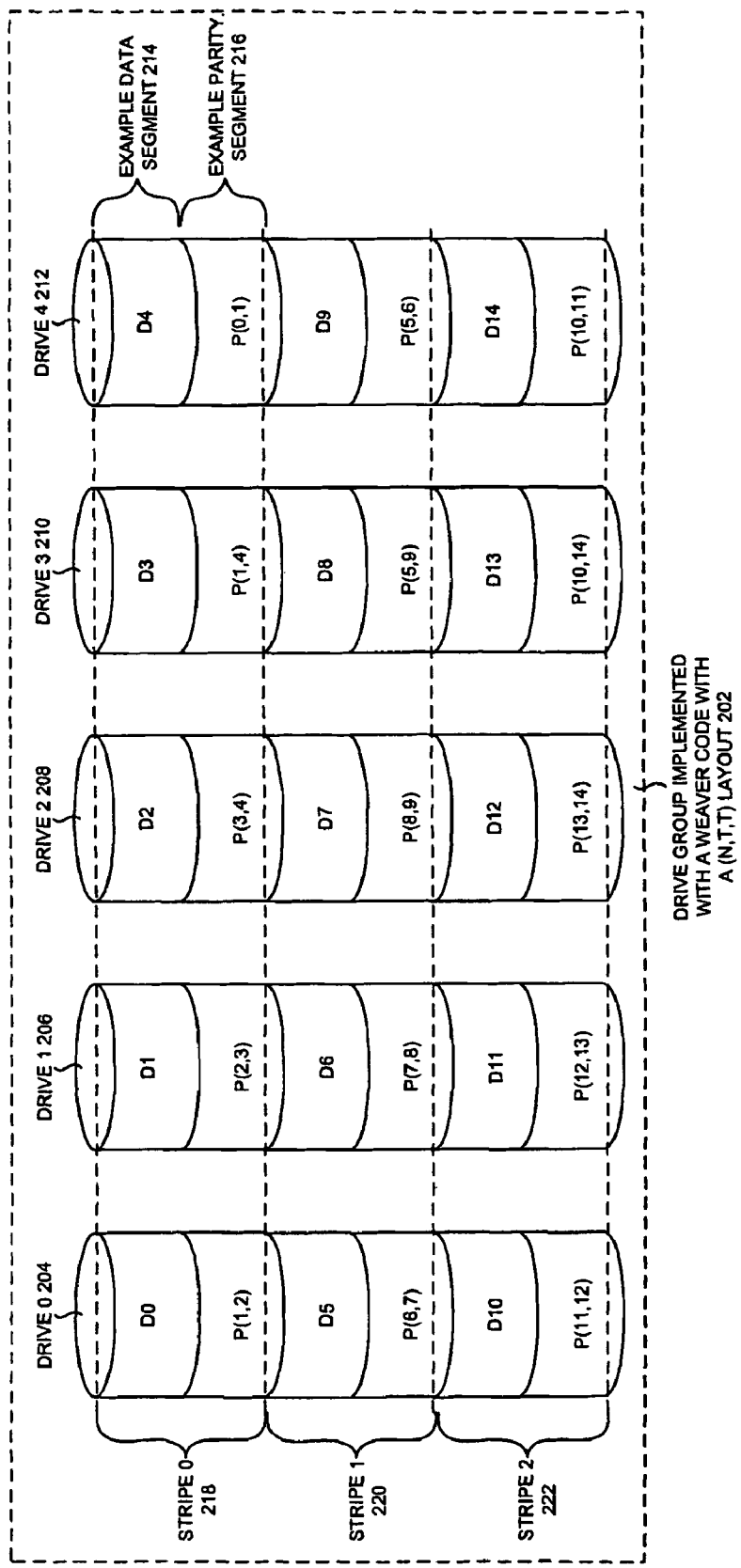
FIG. 2 is an exploded view of drive group implemented with a weaver code with a (n,t,t) layout as illustrated in FIG. 1, according to one embodiment.

FIG. 2 is an exploded view of drive group implemented with a WEAVER code with a (n,t,t) layout as illustrated in FIG. 1, according to one embodiment. Particularly, FIG. 2 illustrates a drive group implemented with a WEAVER code with a (n,t,t,) layout 202, a drive-0 204, a drive-1 206, a drive-2 208, a drive-3 210, a drive-4 212, an example data segment 214, an example parity segment 216, a stripe-0 218, a stripe-1 220, and a stripe-2 222, according to one embodiment.

In an example embodiment the drive group implemented with a WEAVER code with a (n,t,t) layout 202 includes the drive-0 204, the drive-1 206, the drive-2 208, the drive-3 210 and the drive-4 212. The drives include data segments and parity segments.

According to one embodiment, FIG. 2 illustrates a WEAVER layout example. The drive-0 204, the drive-1 206, the drive-2 208, the drive-3 210 and the drive-4 212 are the drives of a drive group. The drive reads and writes data onto a storage medium. The information contained within each stripe may be either data segment (Dx) or parity segment (P(y,z)). For example, the stripe-0 218 may include a D0 and a P (1, 2) of the drive-0 204, a D1 and a P (2, 3) of the drive-1 206, a D2 and a P (3, 4) of the drive-2 208, a D3 and a P (1, 4) of the drive-3 210, and a D4 and a P (0, 1) of the drive-4 212. The stripe-1 220 includes a D5 and a P (6, 7) of the drive-0 204, a D6 and a P (7, 8) of the drive-1 206, a D7 and a P (8, 9) of the drive-2 208, a D8 and a P (5, 9) of the drive-3 210, and a D9 and a P (5, 6) of the drive-4 212. The stripe-2 222 includes a D10 and a P (11, 12) of the drive-0 204, a D11 and a P (12, 13) of the drive-1 206, a D12 and a P (13, 14) of the drive-2 208, a D13 and a P (10, 14) of the drive-3 210, and a D14 and a P (10, 11) of the drive-4 212. The stripe includes a group of segments at the same physical drive offset across the entire drive group. The stripe includes information that may include a specified data segment and a specified parity segment. Parity information for each data segment contains in t parity segments, where t is the fault tolerance of the WEAVER Code. In a particular example embodiment FIG. 2 illustrates the fault tolerance of 2 and the WEAVER Parity Defining Set as WEAVER (n, 2, 2), where n is the number of drives in the drive group.

Figure 3:
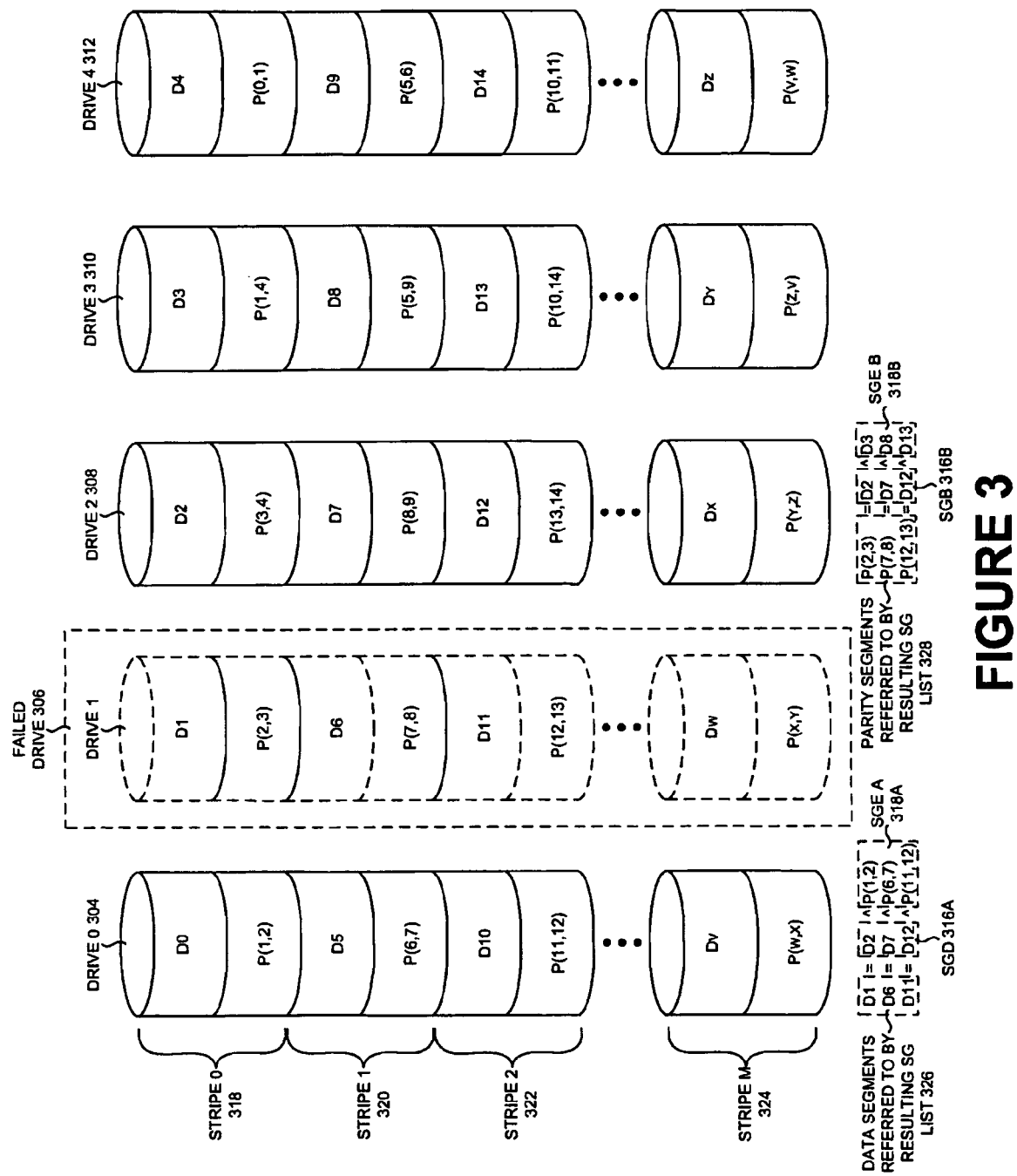
FIG. 3 is a systematic view illustrating a weaver layout with a failed drive according to one embodiment.

FIG. 3 is a systematic view illustrating a WEAVER layout with a failed drive according to one embodiment. Particularly, FIG. 3 illustrates a drive-0 304, a failed drive 306, a drive-2 308, a drive-3 310, a drive-4 312, a scatter/gather list D 316A, a scatter/gather list B 316B, a stripe-0 318, a stripe-1 320, a stripe-2 322, and a stripe-m 324, according to one embodiment.

In a particular example embodiment a drive group consists of five drives the drive-0 304, the failed drive (drive-1) 306, the drive-2 308, the drive-3 310, the drive-4 312. In a particular example embodiment, the WEAVER code is (5, 2, 2). The failed drive 306 may be identified. The failed drive 306 may be replaced with the replacement drive 128. The data segments and the parity segments of the failed drive 306 are regenerated and written to the replacement drive 128. A parity of the data segment is located on a different drive and on a same stripe. Reconstruction of data segments and parity segments is performed one stripe at a time.

A set of scatter/gather lists is generated from a number of the other drives of the drive group using the initial scatter/gather list module 106. A scatter/gather list is created by modifying a pointer data of the set of scatter/gather lists using the list modifier module 114. A set of data pointers of set of scatter/gather lists is modified to generate two scatter/gather lists.

For example, the pointer data of the scatter/gather list A 108A, the scatter/gather list B 110B, the scatter/gather list B 110C and the scatter/gather list C 112 B are modified to create scattered gathered lists 116A and 118A. An additional scatter/gather list is generated from the set of scatter/gather lists. The set of scatter/gather lists includes at number of scatter/gather lists used to reconstruct a missing data segment of a failed disk. The set of scatter/gather lists includes an additional t number of scatter/gather lists used to reconstruct a missing parity segment of the failed disk.

The single XOR operation 122 is performed on the data segment, the parity segment, the additional data segment and the additional parity segment to form a resulting scatter/gather list including a resulting data segment and a resulting parity segment. The resulting data segment and the resulting parity segment are written as sequenced in the resulting scatter/gather list to the replacement drive 128. The replacement drive 128 includes a functional equivalent of the failed drive.

Figure 4:
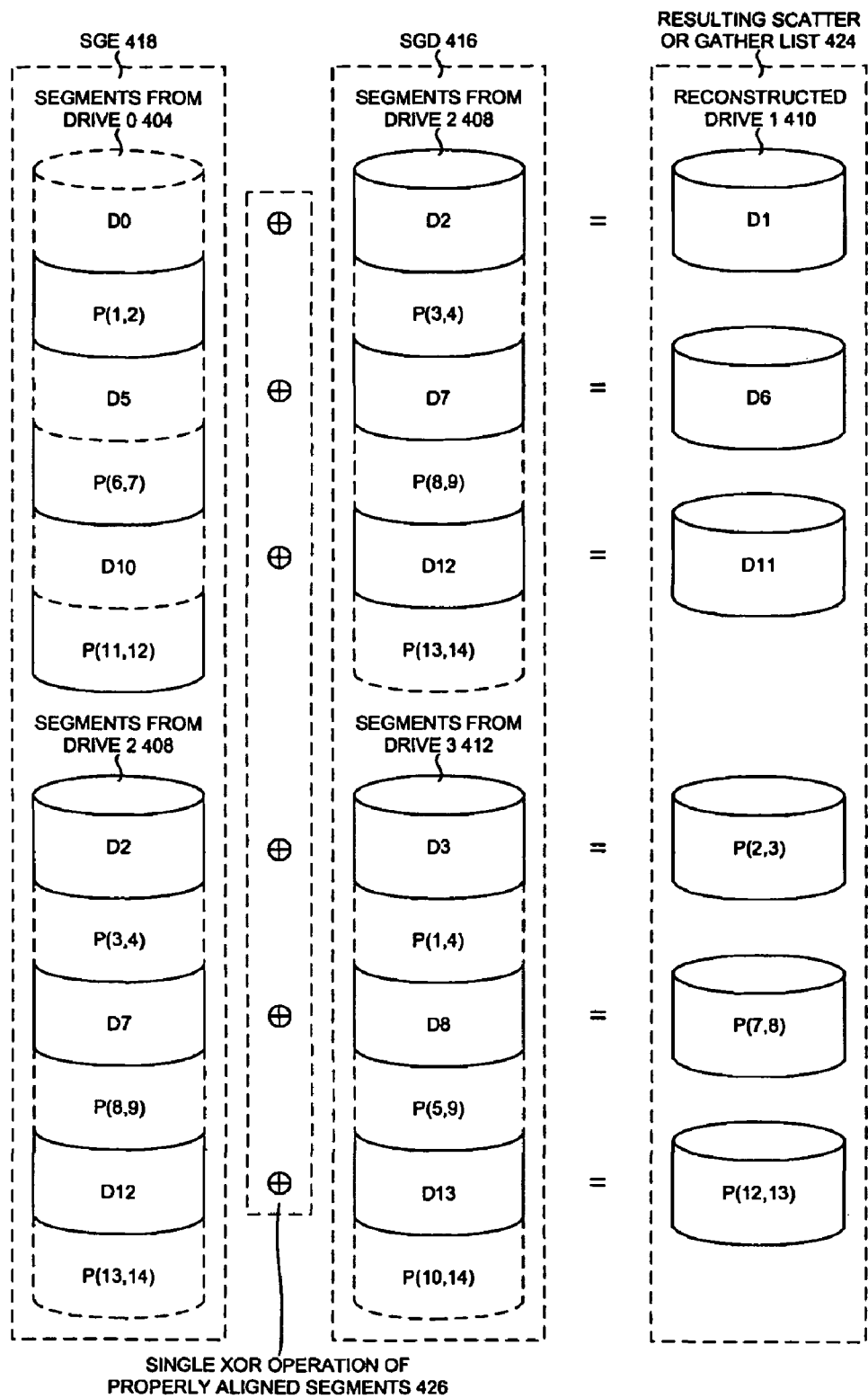
FIG. 4 is a systematic view illustrating performance of XOR operation on generated scattered gathered lists, according to one embodiment.

FIG. 4 is a systematic view illustrating performance of XOR operation on generated scattered gathered lists, according to one embodiment. Particularly, FIG. 4 illustrates a segments from drive-0 404, a segments from drive-2 408, a segments from drive-1 410, a segment from drive-3 412, a scatter/gather list E 418, a scatter/gather list D 416, a resulting scatter/gather list 424, and a single XOR operation of properly aligned segments 426, according to one embodiment.

In an example embodiment a single XOR operation is performed on the scatter/gather list E 418 and the scatter/gather list D 416 to obtain the resulting scatter/gather list 424. The scatter/gather list E 418 includes the segments from drive-0 404 and the segments from drive-2 408. The scatter/gather list D 416 includes the segments from drive-2 408 and the segments from drive-3 412. The resulting scatter/gather list 424 includes the reconstructed drive 410.

According to one embodiment the single XOR operation 122 is performed on the scatter/gather list A 418 and the scatter/gather list D 416. To complete the single XOR operation 122 the scattered or gathered lists is combined to form t lists and then passed on to the XOR engine 120. The resulting scattered or gathered list 424 obtained from the XOR operation includes the resulting data segments and the resulting parity segments. The resulting data segment is equivalent to a lost data segment of the failed drive. The resulting scatter/gather list 424 may include the missing data segments D1, D6, and D11 and the parity segments P (2, 3), P (7, 8), and P (12, 13) from the failed drive 306. The information is written back to the replacement drive 128.

Figure 5:
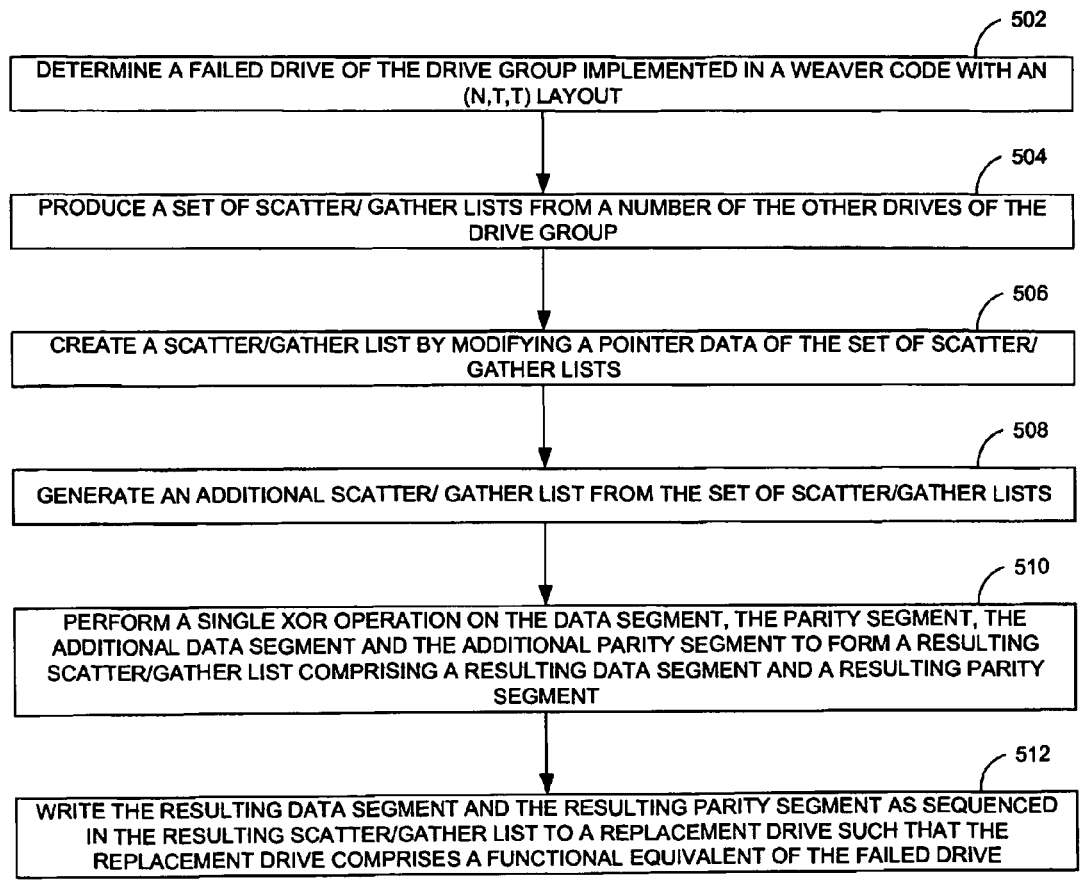
FIG. 5 is a process flow that illustrates reconstructing a failed drive of the drive group, according to another embodiment.

FIG. 5 is a process flow that illustrates reconstructing a failed drive of the drive group, according to another embodiment. In operation 502, a failed drive of the drive group is implemented in a WEAVER code with an (n,t,t) layout may be determined. For example, the failed drive 306 of the drive group implemented in a WEAVER code with an (5, 2, 2) layout may be determined. In operation 504, a set of scatter/gather lists is produced from a number of the other drives of the drive group. For example, the scatter/gather lists may be produced by the initial scatter/gather list module 106 from the drive-0 304, the drive-2 308, the drive-3 320 and the drive-4 312. The set of scatter/gather lists includes a set of pointer data to refer to a data segment, a parity segment, an additional data segment and an additional parity segment.

In operation 506, a scatter/gather list is created by modifying a pointer data of the set of scatter/gather lists. For example, a scatter/gather list may be modified by the list modifier module 114 by modifying the pointer data of the scatter/gather list A 108B, the scatter/gather list B 110B, the scatter/gather list B 110C and the scatter/gather list C 112B. The scatter/gather list includes a modified set of pointer data to refer to the data segment and the parity segment. In operation 508, an additional scatter/gather list is generated from the set of scatter/gather lists. The additional scatter/gather list includes an additional set of modified pointer data to refer to the additional data segment and the additional parity segment.

In operation 510, the single XOR 122 operation is performed on the data segment, the parity segment, the additional data segment and the additional parity segment to form a resulting scatter/gather list including a resulting data segment and a resulting parity segment. For example, the single may be performed on the scatter/gather list D 118B and the scatter/gather list E 118C to for the resulting scatter/gather list 124. In operation 512, the resulting data segment and the resulting parity segment is written as sequenced in the resulting scatter/gather list to the replacement drive 128. For example, the replacement drive 128 may include a functional equivalent of the failed drive.

Figure 6:
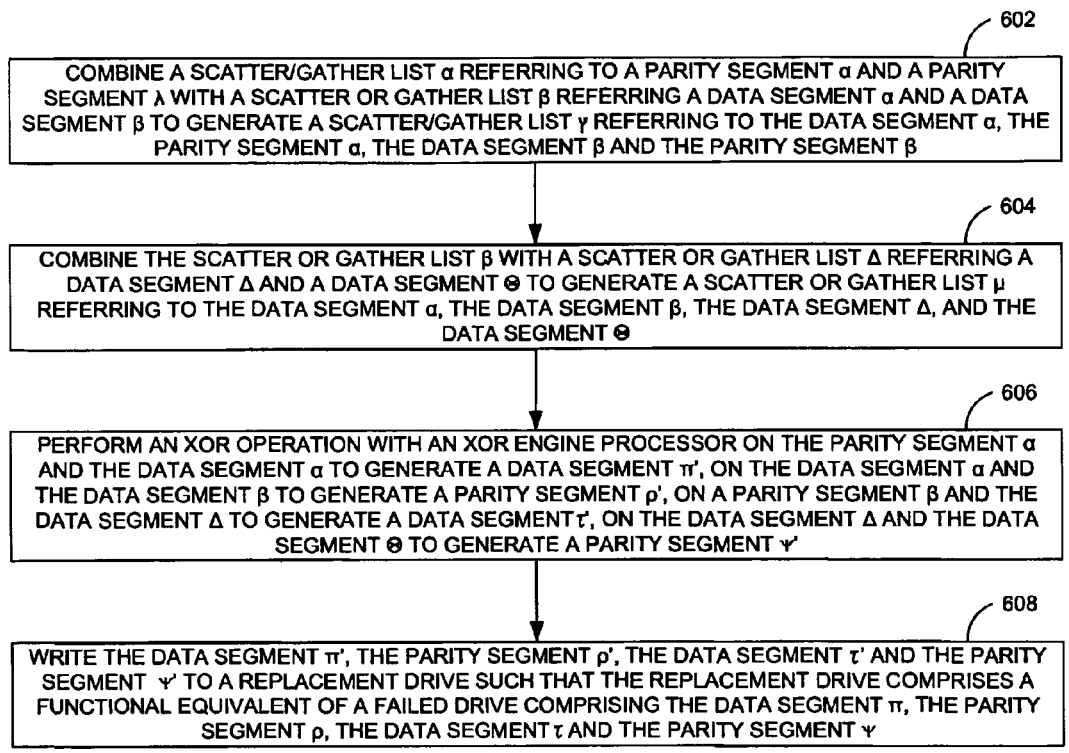
FIG. 6 is a process flow that illustrates reconstructing a redundant array of independent disks with a weaver code layout, according to yet another embodiment.

FIG. 6 is a process flow that illustrates reconstructing a redundant array of independent disks with a WEAVER code layout, according to yet another embodiment. In operation 602 a scatter/gather list a referring to a parity segment α and a parity segment λ is combined with a scatter/gather list β referring a data segment α and a data segment β to generate a scatter/gather list γ referring to the data segment α, the parity segment α, the data segment β and the parity segment β. In operation 604, the scatter/gather list β is combined with a scatter/gather list Δ referring to a data segment A and a data segment Θ to generate a scatter/gather list μ referring to the data segment α, the data segment β, the data segment Δ, and the data segment Θ.

In operation 606, an XOR operation is performed with an XOR engine processor on the parity segment α and the data segment α to generate a data segment π', on the data segment α and the data segment β to generate a parity segment ρ', on a parity segment β and the data segment Δ to generate a data segment τ', on the data segment A and the data segment Θ to generate a parity segment ψ'. For example, the single XOR operation 122 may be performed with the XOR engine 120 on the parity segment P (1, 2) and the data segment D2 to generate a data segment D1, on the data segment D2 and the data segment D3 to generate a parity segment P (2, 3), on a parity segment P (6,7) and the data segment D7 to generate a data segment D6, on the data segment D12 and the data segment D13 to generate the parity segment P (12, 13) as illustrated in FIG. 3. In operation 608, the data segment π', the parity segment ρ', the data segment τ' and the parity segment ψ' is written to a replacement drive 128. The replacement drive includes a functional equivalent of a failed drive including the data segment π, the parity segment ρ, the data segment τ and the parity segment ψ. For example, the data segment D1, the parity segment P (2, 3), the data segment D6, the parity segment P (7, 8) may be written to the replacement drive 128.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry, firmware, software or any combination of hardware, firmware, or software embodied in a machine readable medium. For example, the various electrical structures and methods may be embodied using transistors, logic gates, application specific integrated (ASIC) circuitry or Digital Signal Processor (DSP) circuitry.

Particularly, the WEAVER code module 104, the initial scatter/gather list module 106, the list modifier module 114 of FIG. 1 and the other modules may be enabled using software and/or using transistors, logic gates, and electrical circuits (e.g., application specific integrated ASIC circuitry) such as a WEAVER code circuit, an initial scatter/gather list circuit, a list modifier circuit and other circuit.

In addition, it will be appreciated that the various operations, processes, and methods disclosed herein may be embodied in a machine-readable medium or a machine accessible medium compatible with a data processing system, and may be performed in any order. Accordingly, the Specification and Drawings are to be regarded in an illustrative rather than a restrictive sense.

What is claimed is:

1. A computer-implemented method of reconstructing a drive of a redundant array of independent disks comprising:
   determining a failed drive of the drive group implemented in a WEAVER code with an (n,t,t) layout;
   producing a set of scatter/gather lists from a number of the other drives of the drive group and wherein the set of scatter/gather lists comprises a set of pointer data to refer to a data segment, a parity segment, an additional data segment and an additional parity segment;
   creating a scatter/gather list by modifying a pointer data of the set of scatter/gather lists and wherein the scatter/gather list comprises a modified set of pointer data to refer to the data segment and the parity segment;
   generating an additional scatter/gather list from the set of scatter/gather lists and wherein the additional scatter/gather list comprises an additional set of modified pointer data to refer to the additional data segment and the additional parity segment;
   performing a single XOR operation on the data segment, the parity segment, the additional data segment and the additional parity segment to form a resulting scatter/gather list comprising a resulting data segment and a resulting parity segment; and
   writing the resulting data segment and the resulting parity segment as sequenced in the resulting scatter/gather list to a replacement drive such that the replacement drive comprises a functional equivalent of the failed drive.

2. The method of claim 1 further comprising:
   arranging the resulting data segment and the resulting parity segment such that the resulting scatter/gather list comprises a same sequence as the failed drive.

3. The method of claim 2, wherein the resulting data segment results from an XOR operation of the data segment and the additional parity segment.

4. The method of claim 3, wherein the resulting parity segment results from an XOR operation of the data segment and the additional data segment.

5. The method of claim 1, wherein the resulting data segment is equivalent to a failed drive data segment and the resulting parity segment is equivalent to a failed drive parity segment.

6. The method of claim 2,
   wherein n equals a number of drives in the drive group,
   wherein t equals a fault tolerance of the WEAVER Code layout, and
   wherein a stripe comprises an information comprising at least one of a specified data segment and a specified parity segment.

7. The method of claim 3, wherein a parity of the data segment is located on a different drive and on a same stripe.

8. The method of claim 4,
   wherein the set of scatter/gather lists comprises at number of scatter/gather lists used to reconstruct a missing data segment of a failed disk, and
   wherein the set of scatter/gather lists comprises an additional t number of scatter/gather lists used to reconstruct a missing parity segment of the failed disk.

9. The method of claim 4 further comprising:
   modifying a set of data pointers of set of scatter/gather lists to generate two scatter/gather lists.

10. The method of claim 1, wherein a machine is caused to perform the method of claim 1 when a set of instructions in a form of a machine-readable medium is executed by the machine.

11. A computer-implemented method of redundant array of independent disks with a WEAVER code layout comprising:
    combining a scatter/gather list $\alpha$ referring to a parity segment $\alpha$ and a parity segment $\lambda$ with a scatter/gather list $\beta$ referring a data segment $\alpha$ and a data segment $\beta$ to generate a scatter/gather list $\gamma$ referring to the data segment $\alpha$, the parity segment $\alpha$, the data segment $\beta$ and the parity segment $\beta$;
    combining the scatter/gather list $\beta$ with a scatter/gather list $\Delta$ referring to a data segment $\Delta$ and a data segment $\Theta$ to generate a scatter/gather list $\mu$ referring to the data segment $\alpha$, the data segment $\beta$, the data segment $\Delta$, and the data segment $\Theta$;
    performing an XOR operation with an XOR engine processor on the parity segment $\alpha$ and the data segment $\alpha$ to generate a data segment $\pi'$, on the data segment $\alpha$ and the data segment $\beta$ to generate a parity segment $\rho'$, on a parity segment $\beta$ and the data segment $\Delta$ to generate a data segment $\tau'$, on the data segment $\Delta$ and the data segment $\Theta$ to generate a parity segment $\psi'$; and
    writing the data segment $\pi'$, the parity segment $\rho'$, the data segment $\tau'$ and the parity segment $\psi'$ to a replacement drive such that the replacement drive comprises a functional equivalent of a failed drive comprising the data segment $\pi$, the parity segment $\rho$, the data segment $\tau$ and the parity segment $\psi$.

12. The method of claim 11 further comprising:
    writing the data segment $\alpha$, the parity segment $\alpha$, the data segment $\beta$, the parity segment $\beta$, the data segment $\alpha$, the data segment $\beta$, the data segment $\Delta$, and the data segment $\Theta$ to a computer-readable buffer memory.

13. The method of claim 12 further comprising:
    sequencing the data segment $\alpha$, the parity segment $\alpha$, the data segment $\beta$ and the parity segment $\beta$ according in a specified order; and
    sequencing the data segment $\alpha$, the data segment $\beta$, the data segment $\Delta$, and the data segment $\Theta$ according in an other specified order.

14. The method of claim 13 further comprising:
    identifying the failed drive.

15. The method of claim 14 further comprising:
    sequencing the data segment $\pi'$, the parity segment $\rho'$, the data segment $\tau'$ and the parity segment $\psi'$ according to the same order as the data segment $\pi$, the a parity segment $\rho$, the data segment $\tau$ and the parity segment $\psi$ of the failed drive.

16. The method of claim 15 further comprising:
implementing a WEAVER code with an (n,t,t) layout on the redundant array of independent disks.

17. An apparatus for reconstructing a drive of a redundant array of independent disks comprising: the redundant array of independent disks;
- a WEAVER code module to implement a WEAVER code with a (n,t,t) layout on a drive group of the redundant array of independent disks;
- an initial list module to produce a set of scatter/gather lists from a number of the other drives of the drive group and wherein the set of scatter/gather lists comprises a set of pointer data to refer to a data segment, a parity segment, an additional data segment and an additional parity segment;
- a list modifier module to create a scatter/gather list by modifying a pointer data of the set of scatter/gather lists and wherein the scatter/gather list comprises a modified set of pointer data to refer to the data segment and the parity segment and to generate an additional scatter/gather list from the set of scatter/gather lists and wherein the additional scatter/gather list comprises an additional set of modified pointer data to refer to the additional data segment and the additional parity segment;
- an XOR engine to perform a single XOR operation on the data segment, the parity segment, the additional data segment and the additional parity segment to form a resulting scatter/gather list comprising a resulting data segment and a resulting parity segment; and
- a reconstruction module to write the resulting data segment and the resulting parity segment as sequenced in the resulting scatter/gather list to a replacement drive such that the replacement drive comprises a functional equivalent of a failed drive.

18. The apparatus of claim 17, wherein the reconstruction module arranges the resulting data segment and the resulting parity segment such that the resulting scatter/gather list comprises a same sequence as the failed drive.

19. The apparatus of claim 18,
wherein the resulting data segment is equivalent to a lost data segment of the failed drive; and
wherein the resulting parity data segment is equivalent to a lost parity data segment of the failed drive.

20. The apparatus of claim 19,
wherein a single XOR operation is performed on the data segment, the parity segment of the scatter/gather list, the additional data segment and the additional parity segment to form a resulting scatter/gather list.

* * * * *